(12) United States Patent
Schlangen

(10) Patent No.: US 7,735,839 B1
(45) Date of Patent: Jun. 15, 2010

(54) VEHICLE AIR SUSPENSION PROVIDING INTEGRAL WHEELCHAIR LIFT

(76) Inventor: Phillip E. Schlangen, 1920 S. First St., Apartment 1601, Minneapolis, MN (US) 55454

( * ) Notice: Subject to any disclaimer, the term of this patent is extended or adjusted under 35 U.S.C. 154(b) by 625 days.

(21) Appl. No.: 11/502,715

(22) Filed: Aug. 14, 2006

Related U.S. Application Data

(60) Provisional application No. 60/789,209, filed on Apr. 5, 2006.

(51) Int. Cl.
    *B60G 17/00* (2006.01)
(52) U.S. Cl. .............. 280/6.151; 280/6.153; 280/6.155; 280/6.156
(58) Field of Classification Search ............. 280/5.514, 280/6.151, 6.153, 6.155, 6.156, 6.157
See application file for complete search history.

(56) References Cited

U.S. PATENT DOCUMENTS

| | | | |
|---|---|---|---|
| 4,067,558 A | 1/1978 | Keijzer | |
| 4,096,955 A | 6/1978 | Dake | |
| 4,133,437 A | 1/1979 | Gates | |
| 4,248,455 A * | 2/1981 | Manning | 280/6.152 |
| 4,372,572 A * | 2/1983 | Verschage | 280/441.2 |
| 4,664,584 A | 5/1987 | Braun et al. | |
| 4,900,055 A * | 2/1990 | Wright | 280/6.15 |
| 4,930,807 A * | 6/1990 | Lachaize | 280/5.505 |
| 5,083,275 A * | 1/1992 | Kawagoe et al. | 701/37 |
| 5,288,197 A * | 2/1994 | Harris | 414/495 |
| 5,913,525 A * | 6/1999 | Schneider et al. | 280/6.153 |
| 6,098,995 A | 8/2000 | Danis | |
| 6,135,700 A * | 10/2000 | Collins | 414/476 |
| D440,728 S | 4/2001 | Schlangen | |
| 6,273,435 B1 * | 8/2001 | Stringer | 280/6.151 |
| 6,848,693 B2 * | 2/2005 | Schneider | 280/6.153 |
| 7,051,851 B2 * | 5/2006 | Svartz et al. | 188/300 |
| 7,104,547 B2 * | 9/2006 | Brookes et al. | 280/6.153 |
| 7,261,304 B2 * | 8/2007 | Trudeau et al. | 280/6.153 |
| 7,316,406 B2 * | 1/2008 | Kimura et al. | 280/6.157 |
| 2003/0067136 A1 * | 4/2003 | Scott et al. | 280/124.157 |
| 2005/0067799 A1 * | 3/2005 | Smith | 280/6.151 |
| 2005/0110229 A1 * | 5/2005 | Kimura et al. | 280/5.514 |

* cited by examiner

*Primary Examiner*—Toan C To
(74) *Attorney, Agent, or Firm*—Richard Otto Bartz

(57) ABSTRACT

A motor vehicle has a frame assembly with a generally flat platform for supporting a wheelchair within the interior compartment of the vehicle. Air cylinders couple the frame assembly to wheel assemblies operate to move the frame assembly to an up vehicle driving position and to a down position wherein the platform engages the vehicle support surface or ground whereby the wheelchair can be moved directly onto the platform.

11 Claims, 4 Drawing Sheets

VEHICLE AIR SUSPENSION PROVIDING INTEGRAL WHEELCHAIR LIFT

CROSS REFERENCE TO RELATED APPLICATION

This application claims the priority benefit of U.S. Application Ser. No. 60/789,209 filed Apr. 5, 2006.

FIELD OF THE INVENTION

The invention relates to a vehicle having a frame and air suspension system operable to move the frame from a ground engaging down position to a driving up position. More particularly, the vehicle frame has a generally flat platform engageable with the ground to allow a wheelchair to be moved on the platform into the vehicle's interior compartment without a lift or ramp.

BACKGROUND OF THE INVENTION

Wheelchair lifts mounted on vehicles, such as buses, vans, motor homes and automobiles, provide wheelchair users access to the interior of the vehicles thereby increasing their mobility and enabling these people to become more self-reliant and independent. Wheelchair lifts have generally horizontal platforms which are used to support manual and motor driven wheelchairs along with persons located on the wheelchairs. Lift structures connected to the platforms operate to selectively raise and lower the platforms. When the platforms are in the lower or ground positions the wheelchairs are moved onto the platforms. The platforms are raised by the lift structures to a selected elevation, such as the floor of the vehicle, and then moved off the platform into the interior compartment of the vehicle. Actuators, such as electric motors, operating screws and hydraulic cylinders, are used to move the platforms to transport positions within the confines of the vehicle. The wheelchair is secured to the vehicle floor to prevent inadvertent movement of the wheelchair within the vehicle. In some vehicles, the wheelchair is moved to a vehicle operator position and anchored thereto to allow the wheelchair user to operate the vehicle. Examples of wheelchair lifts are disclosed in U.S. Pat. Nos. 4,096,955; 4,133,437; 4,664,584 and D440,728. The wheelchair lifts require modifications of the bodies of the vehicles and require considerable labor and installation costs.

Wheelchair lifts for motor vehicles do not utilize vehicle suspension devices for loading wheelchairs into the vehicle and unloading wheelchairs from the vehicle. Examples of vehicle body suspension systems are disclosed in the following U.S. patents. Keijzer et al in U.S. Pat. No. 4,067,558 discloses a motor vehicle wheel suspension strut for converting the conventional suspension unit to an air adjustable type suspension without discarding the original shock absorber and related components. This suspension strut does not allow the vehicle floor to be lowered when the vehicle is packed.

Danis in U.S. Pat. No. 6,098,995 discloses a motor vehicle suspension system for providing a kneeling function to a vehicle having a lowered floor for accommodating the loading and unloading of passengers. The suspension system includes a pair of springs and a pair of suspension members or shock absorbers operatively connected to the rear wheels of the vehicle for supporting the load on the vehicle. An air compressor supplies air to the shock absorbers. An exhaust valve associated with the air system allows air to exhaust from the shock absorbers whereby the vehicle floor moves down from above a normal height and allows all the air to exhaust from the shock absorbers whereby the vehicle floor moves down to the kneeling position above the support surfaces of the vehicle.

Air springs have been designed to fit directly into conventional rear coil spring mounts to support the rear portion of a motor vehicle, such as a truck, sport utility, wagon and motor homes. Conventional leaf springs have been replaced with parallel linkages and air springs to lower a vehicle's body to improve handling a load capacity. The air spring suspension systems maintain ground clearance and do not allow the vehicle's frame to be moved into engagement with the ground or vehicle support surface.

SUMMARY OF THE INVENTION

The invention comprises a vehicle having a frame assembly and an air suspension system operatively coupling the frame assembly to front and rear wheel assemblies. The frame assembly includes a generally flat platform providing a floor adjacent the inside of an entrance to the interior compartment of the vehicle. The platform has a top surface having a size to accommodate a conventional wheelchair. The air suspension system includes a plurality of air cylinders connected to the frame assembly and wheel assemblies operable to retain the frame assembly and vehicle body on the frame assembly in an up vehicle driving position and to move the vehicle frame assembly down to locate the platform in engagement with the ground or vehicle support surface. Wheelchairs, persons or loads can be moved directly on the platform. Lift structures and ramps are not used to elevate a wheelchair and move the elevated wheelchair into the vehicle.

DESCRIPTION OF THE INVENTION

Figure 1:
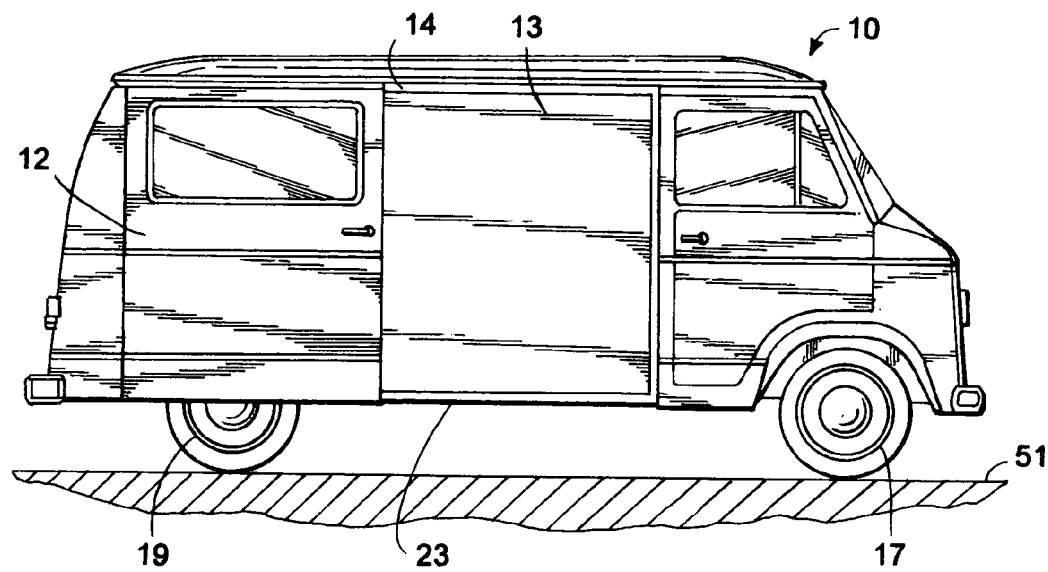
FIG. 1 is a side elevational view of a motor vehicle having an air suspension system showing the vehicle frame assembly and body in a driving up position.
Figure 2:
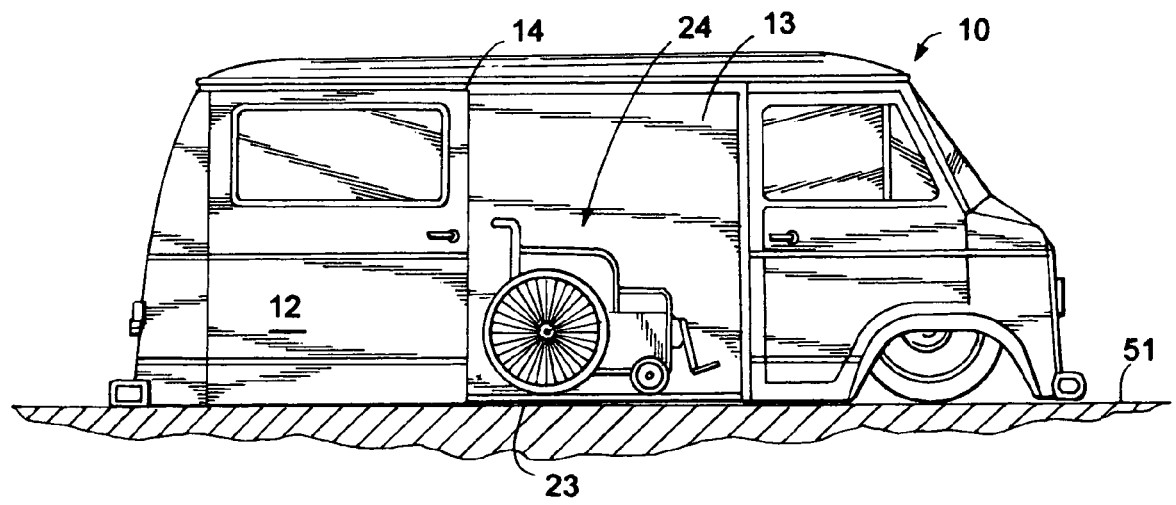
FIG. 2 is a side elevational view of the motor vehicle of FIG. 1 showing the motor vehicle's frame assembly and body in a down position accommodating a wheelchair.
Figure 3:
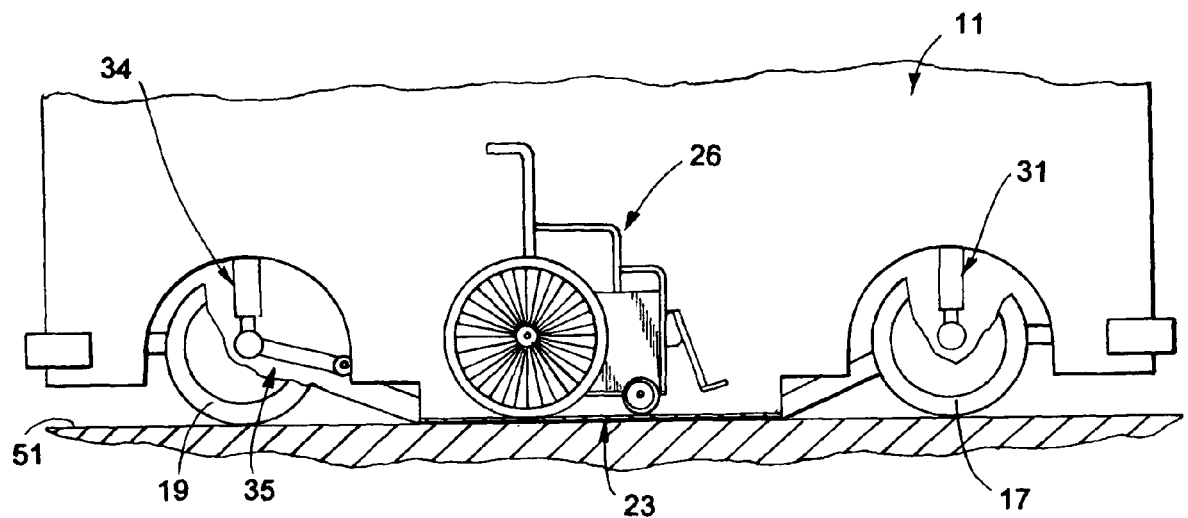
FIG. 3 is a perspective view of the chassis of the motor vehicle of FIG. 1 showing the platform of the motor vehicle's frame assembly.

A motor vehicle 10, shown in FIGS. 1 and 2, has a chassis 11 comprising a body having a movable door 12 for closing an entrance 13 to the passenger compartment of the vehicle. Door 12 longitudinally moves on a longitudinal track 14 between its open and shut positions. Chassis 11 is a secured to a frame assembly 15 operatively connected to front wheels 16 and 17 and rear wheels 18 and 19. Vehicle 10 includes an engine and transmission (not shown) operable to drive either front wheels 16, 17 or rear wheels 18, 19. An alternative vehicle body can have hinged doors that swing about vertical axes between open and closed positions. Vehicle 10 is illustrated as a van or sport utility type motor vehicle. Other types of motor vehicles such as pickup trucks, motor homes, sedan and coup automobiles can be equipped with the air suspension system and a frame assembly operable to lower the frame assembly to a down position in engagement with the ground or vehicle support surface to allow a wheelchair, persons and other loads having wheels to be moved directly on the frame assembly in the interior compartment of the vehicle.

Figure 4:
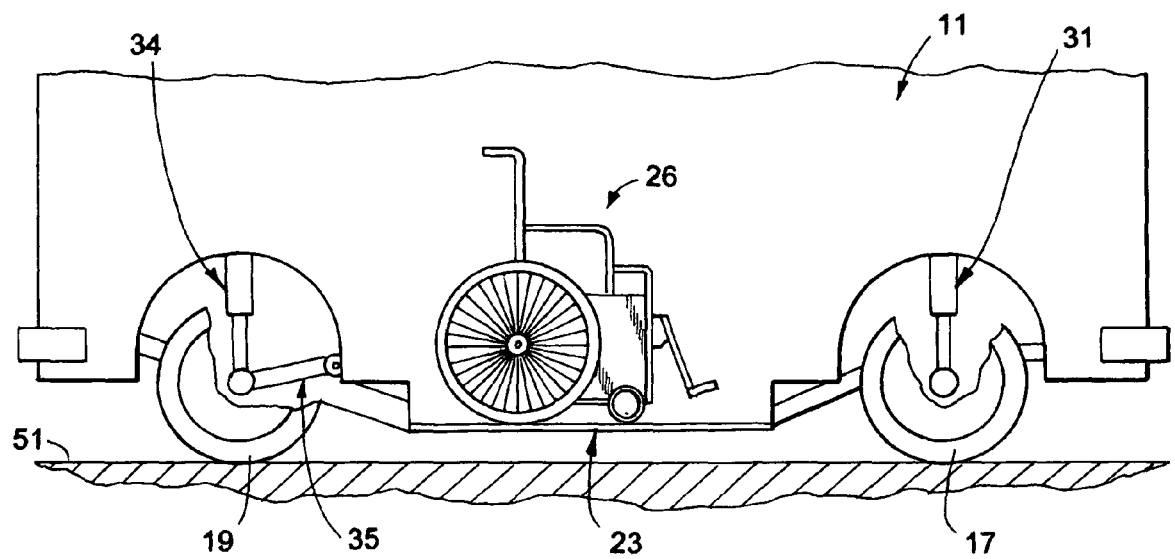
FIG. 4 is a diagrammatic top plan view of the frame assembly of the motor vehicle of FIG. 1.
Figure 5:
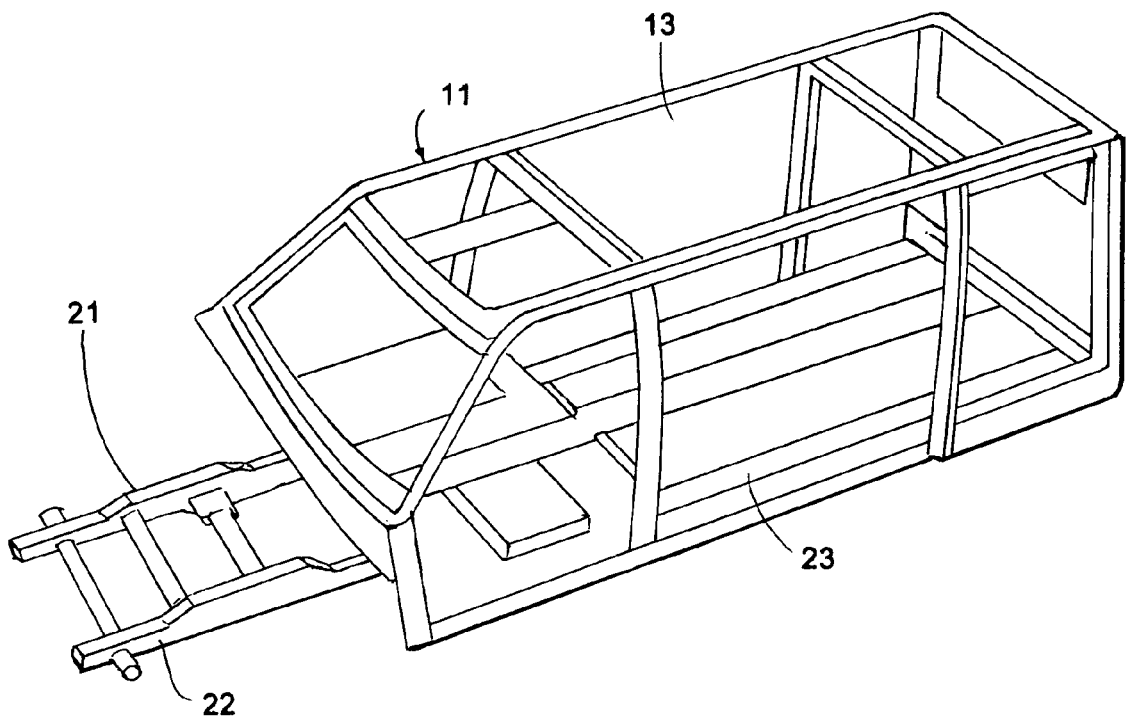
FIG. 5 is a diagrammatic side elevational view of the motor vehicle's frame assembly in the down position supporting a wheelchair.
Figure 6:
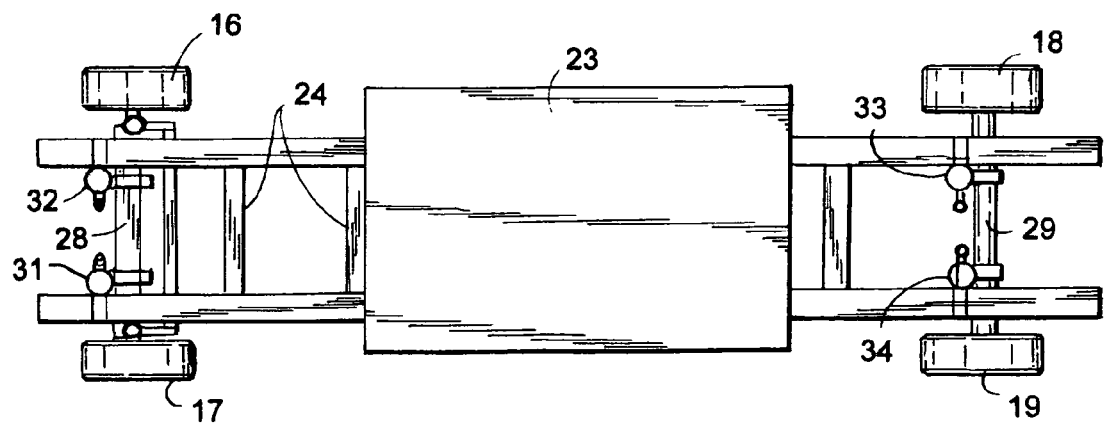
FIG. 6 is a diagrammatic side elevational view of the motor vehicle's frame assembly in the driving up position supporting a wheelchair.

Referring to FIG. 4, frame assembly 15 includes a pair of generally parallel beams 21 and 22 secured to a flat platform 23. Cross members 24 are secured to beams 21 and 22. Platform 23 is a steel plate having a flat top surface for supporting a wheelchair 26, persons and other loads. Examples of wheelchairs are disclosed by P. E. Schlangen the U.S. Pat. Nos. 6,375,209; 6,769,705 and Des. 461,502. Platform 23 is a part of the floor of the chassis and body. The platform can extend forward to provide a floor for the drivers compartment of the vehicle. Alternatively, the platform can be the floor of the drivers compartment to allow a person in a wheelchair to operate the vehicle.

Figure 7:
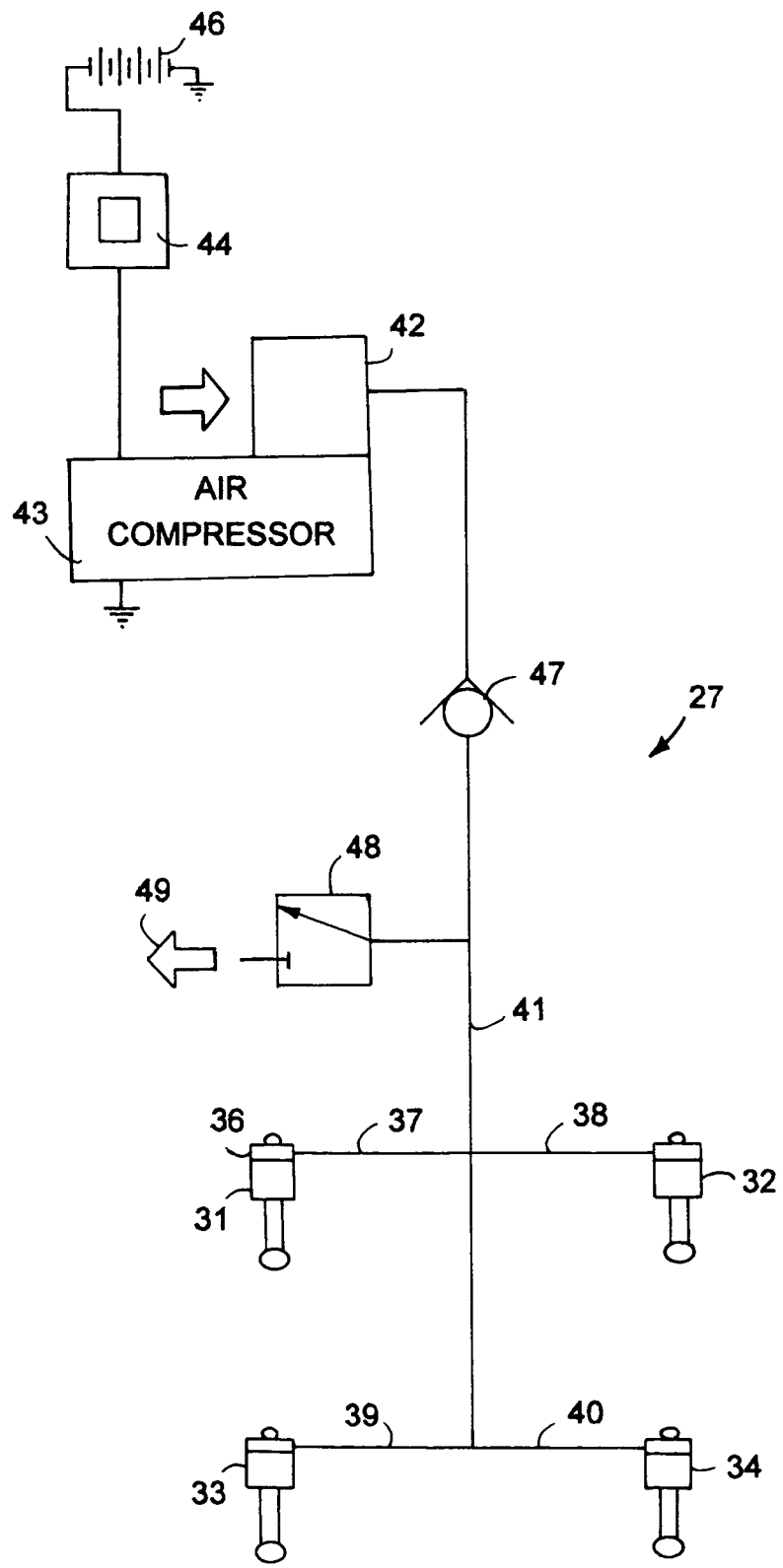
FIG. 7 is a diagram of a pneumatic suspension system operable to move the vehicle's body and frame assembly between up and down positions.

An air suspension system 27 shown in FIGS. 4 and 7 operatively supports frame assembly 15 on the front and rear axles 28 and 29 for wheels 16, 17 and 18, 19. Air suspension system 27 has front air cylinders 31 and 32 and rear air cylinders 33 and 34. Each air cylinder 31-34 is a linear expandable and controllable cylinder unit. Examples of air cylinder designs are sleeve air springs and piston cylinder air springs. The air system 27 can replace the conventional leaf springs and be installed with no welding or fabrication. Vehicle suspension arms 35 mount the front axle to the vehicle frame. As shown in FIG. 7, each air spring 31-34 has an upper cap 36 having an air inlet connected to air lines 37-40. Air lines 37-40 are connected to a main air line 41 leading to an air compressor 42. Air compressor 42 is driven by a DC electric motor 43 connected to a manual on-off switch 44 wired to an electric power supply 46, such as a battery. An air exhaust valve 48 connected to line 41 releases air from air cylinders 31-34 shown by arrow 49. The weight of the chassis 11 with frame assembly 15 causes the air cylinders 31-34 to contract. The frame assembly 15 lowers to the down position until platform engages ground 51 or the vehicle's support surface. a1

In use, air exhaust valve 48 is opened to allow air to vent from air cylinders 31-34. The weight of the vehicle chassis 11 and frame assembly 15 causes air cylinders 31-34 to contract and platform 23 to move down into engagement with the ground or vehicle support surface, such as a concrete floor. Platform 23 being a relatively thin flat plate does not impede a wheelchair from being rolled onto the platform. Also, a person can walk onto platform 23. Loads can be located on platform 23 without lifting as required when loading onto a conventional motor vehicle and truck boxes. When the wheelchair, persons or other loads are on platform 23, air compressor switch 44 is manually moved to the on position whereby the air compressor electric motor operates the air compressor to supply air under pressure through check valve 47 to air cylinders 31-34. The increase in air pressure in air cylinders 31-34 expands the air cylinders 31-34 which elevates frame assembly 15 including platform 23 to an up vehicle driving position. The air pressure in air cylinders 31-34 maintains frame assembly 15 in its up position. Vehicle door 12 is closed before motor vehicle is operated. Wheelchair 26 can be located and locked in a vehicle driving position behind the steering wheel to allow the person in the wheelchair to operate the vehicle.

The air suspension system 27 has been described as having four air cylinders 3-134. Suspension systems having two and three air cylinders can be used to suspend the vehicle frame and body and lower the frame to a ground engaging position. Linear actuators having electric motor driven screws can be used in combination with air cylinders to lower the vehicle's frame to a ground engaging position.

There has been shown an described an embodiment of a motor vehicle with a frame assembly and air suspension system operable to move the frame assembly to an up driving position and a down ground engaging position. Changes in the frame assembly and air suspension system can be made by a person skilled in the relevant art and can be made without departing from the invention.

What is claimed is:

1. A vehicle comprising:
a motor vehicle having a chassis having a passenger compartment,
a frame assembly secured to the chassis,
front wheels and rear wheels for movably supporting the chassis on a support surface,
a platform mounted on the frame assembly for supporting a wheelchair in the passenger compartment,
a front axle connected to the front wheels,
a rear axle connected to the rear wheels,
a suspension apparatus connected to the frame assembly, front axle, and rear axle operable to allow the frame assembly, platform and chassis to be selectively moved between an up vehicle drive position above the support surface and a down position whereby the platform is located adjacent the support surface,
said suspension apparatus having upright air cylinders connected to the frame assembly and front and rear axles operable to move the frame assembly, platform and chassis between an up vehicle driving position and a down position wherein the platform located adjacent the support surface allows the wheelchair to be moved from the support surface directly onto the platform and from the platform onto the support surface, and
an apparatus for supplying air under pressure to said air cylinders to move the frame assembly, platform and chassis from its down position to the up position and retain the frame assembly and platform in the up position and for venting air from the air cylinders whereby the weight of the frame assembly, chassis and platform moves the frame assembly and platform from the up position to the down position whereby the platform is located adjacent the support surface allowing the wheelchair to move from the platform to the support surface and from the support surface onto the platform.

2. The vehicle of claim 1 wherein:
the platform is a generally flat metal plate.

3. The vehicle of claim 1 wherein:
said air cylinders comprising
a pair of first air cylinders coupling the frame assembly to the front axle and
a pair of second air cylinders coupling the frame assembly to the rear axle.

4. The vehicle of claim 3 wherein:
the apparatus for supplying air under pressure to said air cylinders comprises an air compressor,
a first valve operable to direct air from the compressor to said air cylinders and retain air under pressure in said air cylinders to hold the frame assembly and platform in the up position, and a second valve operable to vent air from the air cylinders to allow the frame assembly and platform to move from the up position to the down position.

5. The vehicle of claim 1 wherein:
the apparatus for supplying air under pressure to said air cylinders includes an air compressor.

6. A vehicle for transporting a wheelchair comprising:
a motor vehicle having a chassis having an interior compartment,
a side having an opening open to the exterior of the motor vehicle and the interior compartment, and
a door operable to selectively open and close the opening,
a frame assembly secured to the chassis,
a generally flat platform mounted on the frame assembly located within the interior compartment of the chassis for supporting a wheelchair,
front and rear wheels for movably supporting the frame assembly on a support surface,
a front axle connected to the front wheels,
a rear axle connected to the rear wheels,
wheel suspension arms pivotally connected to the frame assembly and attached to the front and rear axles operable to allow the frame assembly, platform and chassis to be selectively moved between an up position above the support surface and a down position whereby the platform is located adjacent the support surface,
a first pair of expandable and contractible upright air cylinders connected to the front axle and frame assembly,
a second pair of upright expandable and contractible air cylinders connected to the rear axle and frame assembly,
an air compressor for supplying air under pressure to the first and second air cylinders,
a first valve coupled to the air compressor and first and second air cylinders being operable to allow air under pressure to flow to the first and second air cylinders to move and hold the frame assembly, platform and chassis in the up position above the support surface, and
a second valve coupled to the first valve and the first and second air cylinders operable to allow air to vent from the first and second air cylinders whereby the frame assembly, chassis and platform move to the down position wherein the platform is located adjacent the support surface whereby the wheelchair can be moved directly from the support surface through the opening of the chassis onto the platform and alternatively moved from the platform to the support surface.

7. The vehicle of claim 6 wherein:
the platform is a generally flat metal plate.

8. A vehicle comprising:
a motor vehicle including
a frame assembly,
front wheels and rear wheels for movably supporting the frame assembly on a support surface,
a platform mounted on the frame assembly for supporting a wheelchair,
a front axle connected to the front wheels,
a rear axle connected to the rear wheels,
a suspension apparatus connected to the frame assembly, front axle and rear axle operable to allow the frame assembly and platform to be selectively moved between an up vehicle drive position above the support surface and a down position whereby the platform is located adjacent the support surface,
said suspension apparatus including
upright expandable and downward contractible air accommodating members connected to the frame assembly and front and rear axles operable to move the frame assembly and platform between the up vehicle driving position and the down position wherein the platform located adjacent the support surface allows the wheelchair to be moved from the support surface thereby onto the platform and from the platform onto the support surface,
an air compressor for supplying air under pressure to the air accommodating members,
a first valve coupled to the air compressor and air accommodating members to allow air under pressure to flow to the air accommodating members to expand the air accommodating members to move and hold the frame assembly and platform in the up position above the support surface, and
a second valve coupled to the first valve and air accommodating members operable to allow air to vent from the air accommodating members whereby the frame assembly and platform move to the down position wherein the platform is located adjacent the support surface whereby the wheelchair can be moved directly from the support surface onto the platform and alternatively moved from the platform to the support surface.

9. The vehicle of 8 wherein:
the air accommodating members comprise
a pair of first air cylinders connected to the frame assembly and front axle, and
a pair of second air cylinders connected to the frame assembly and rear axle.

10. The vehicle of claim 8 wherein:
the platform is a generally flat metal plate.

11. The vehicle of claim 8 wherein:
the suspension apparatus includes
arms pivotally connected to the frame assembly and attached to the front and rear axles to allow the frame assembly and platform to move between the up and down positions relative to the support surface.

* * * * *